July 4, 1939.  R. C. RUEFF ET AL  2,164,945
ANTISKID CHAIN
Filed May 19, 1938  2 Sheets-Sheet 1
FIG.1.
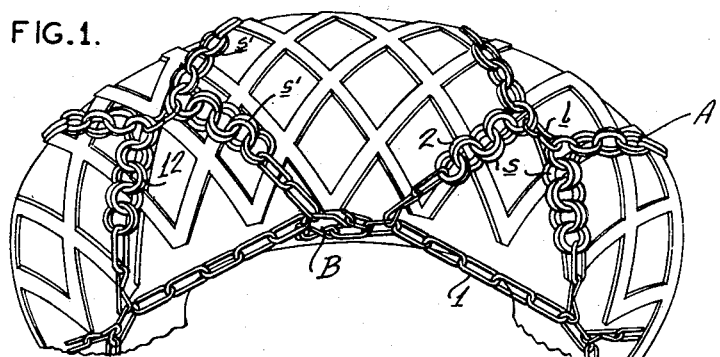
FIG.2.
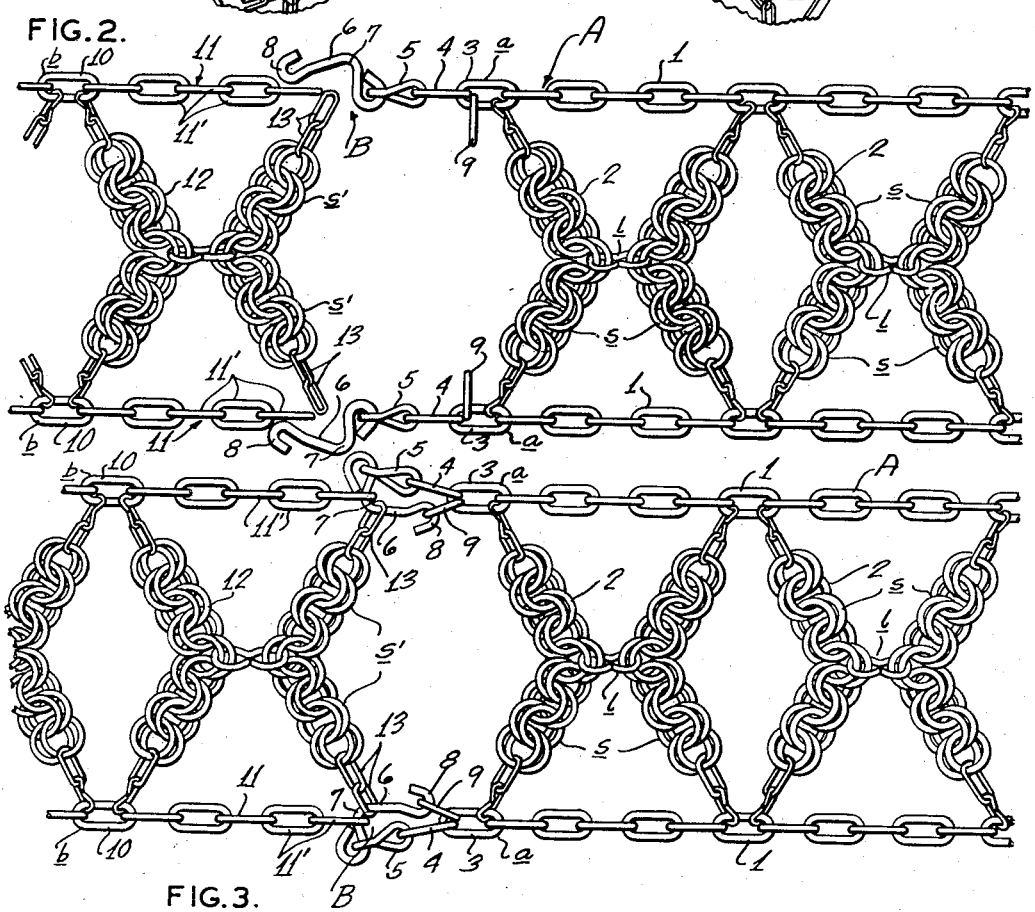
FIG.3.
INVENTORS
ROBERT C. RUEFF
LEONARD HAMMOND
BY Ralph Kalish
ATTORNEY July 4, 1939.  R. C. RUEFF ET AL  2,164,945
ANTISKID CHAIN
Filed May 19, 1938   2 Sheets-Sheet 2
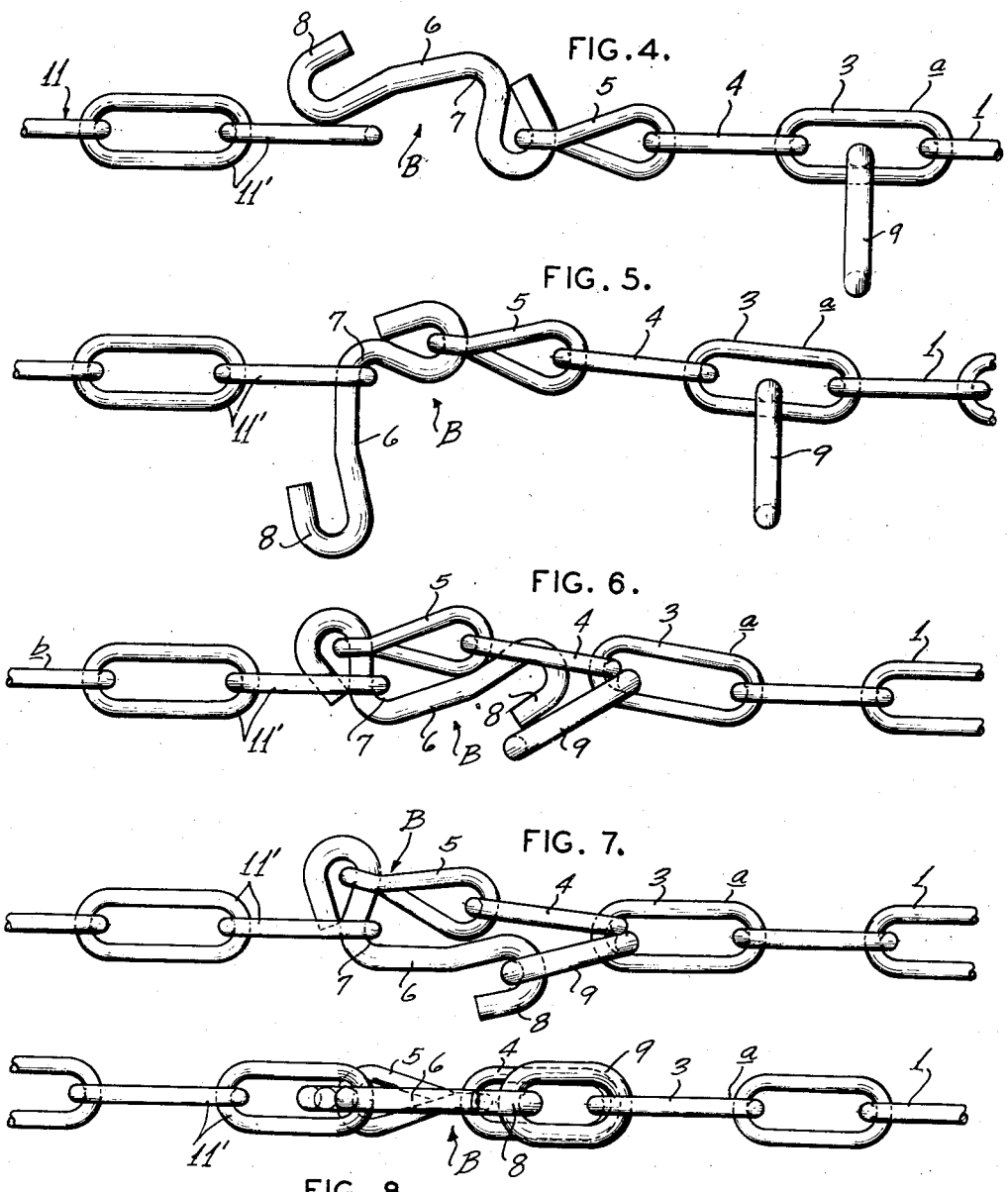
INVENTORS
ROBERT C. RUEFF
LEONARD HAMMOND
BY
ATTORNEY Patented July 4, 1939

2,164,945

UNITED STATES PATENT OFFICE 2,164,945

ANTISKID CHAIN

Robert C. Rueff and Leonard Hammond, St. Louis, Mo., assignors to Nixdorff-Krein Manufacturing Company, St. Louis, Mo., a corporation of Delaware Application May 19, 1938, Serial No. 208,759

6 Claims. (Cl. 152—243)

Our invention relates to certain new and useful improvements in anti-skid or traction chains and, more particularly, to skid chains of the so-called heavy duty type designed for use on tractors, trucks, and the like.

Our present invention has for its primary objects the provision of a new and improved anti-skid or traction chain, which is more simple and economical in construction and operation, which may be installed and removed from the wheel in an exceptionally simple, speedy, and efficient manner, which is provided with a locking device of unusually convenient, easily operable, and rugged structure, which is provided with a freely adjustable or compensating cross-chain member for maintaining an unbroken continuity of cross-chain or traction members around the entire circumference of the wheel or tire to which the chain is applied, and which is otherwise highly efficient in the performance of its stated functions.

And with the above and other objects in view, our invention resides in the novel features of form, construction, arrangement, and combination of the several parts presently described and pointed out in the claims.

In the accompanying drawings (2 sheets):

Figure 1 is a fragmentary perspective view of a tire, illustrating a preferred form of skid chain constructed in accordance with and embodying our present invention;

Figures 2 and 3 are fragmentary plan views of the skid chain of our present invention, illustrating the chain in intermediately locked and fully locked positions, respectively; and Figures 4 to 8, inclusive, are diagrammatic views of the chain lock forming a part of our present invention and illustrating said lock in various positions during the course of closure.

Referring now in more detail and by reference characters to the drawings, which illustrate a preferred embodiment of our present invention, A designates a skid chain comprising a pair of parallel side-chains 1 having disposed therebetween a continuous series of cruciform cross-chain sets 2. Each of these cross-chain sets 2 consists of four relatively short sections of intermeshed, double-ring chain $s$ arranged in X formation about a central link $l$ which may be of any suitable shape, although we have found it preferable to employ a central link $l$ of so-called figure 8 shape, all as best seen in Figures 2 and 3.

One end $a$ of each of the side-chains 1 is provided with a terminal link 3, which is provided with a lock-structure B comprising an intermediate or connector link 4, which is, in turn, provided with a twist link 5, one lobe of which lies in a plane perpendicular to the plane of the other lobe. Swingably mounted in the twist link 5, is a lock-member 6 of irregularly bent shape having an intermediate bight portion 7 and being provided at its end with a hook 8. Also swingably disposed in the terminal link 3 of the side-chain end $a$, is a locking link 9, all as best seen in Figure 2 and for purposes presently more fully appearing. It may be stated in this connection that the combined length of the links 4 and 5 should preferably be substantially equal to the combined length of the link 9 and the lock-member 6 from its bight-portion 7 to its hook 8, thus equalizing the pull on each side of the lock-structure B, as best seen in Figure 7.

The other end $b$ of each of the side-chains 1 is provided with a terminal link 10 having a suitable length of free chain 11 comprising a plurality of connected side-chain links 11' each adapted for engagement with the lock member 6 for the purpose of taking up any slack in the chain. Also permanently mounted in the terminal link 10 of each of the side-chain ends $b$, is a free swinging or compensating cruciform cross-chain 12 having two unattached end portions $s'$, each equipped with a plurality of connected oval links 13, all as best seen in Figures 2 and 3 and for purposes presently more fully appearing.

The action of the locking member may best be understood by reference to the schematic views thereof shown in Figures 4 to 8, inclusive. As was above stated, in locking the side-chain the hook portion 8 of the locking member 6 is inserted through a selected link 11' of the free chain section 11, as shown in Figure 4. The hook member is then pushed through the link 11' and, at the same time, swung forwardly, drawing the link 11' toward the other end $a$ of the side-chain with a sort of lever-like action until the link 11' is connected in the bight portion 7 of the lock member 6, as shown in Figure 5. The hook end 8 of the lock member 6 is then swung backwardly to the position shown in Figure 6, whereupon the locking link 9 may be swung forwardly into hooked engagement with the hook portion 8 of the locking member 6, as shown in Figure 7.

In actual use, the chain is placed upon the tire and the side-chains are drawn up tight. The hook end 8 of the lock member 6 is then inserted through a selected one of the links 11' of the free chain section 11 and thence through the oval link 13 of the compensating chain 12. The hook member is then swung backwardly in the manner above described, drawing the side-chain end *b* toward the side-chain end *a*, thereby tightening the side-chain and, at the same time, tightening the compensating chain 12. When the hook end 8 has been swung backwardly to a position opposite the connector link 4, the locking link 9 may be swung forwardly into hooking engagement with the hook portion 8 of the lock member 6, thereby securely locking the side-chain ends together and holding the skid chain on the wheel. In this position, both the selected link 11' of the free chain 11 and the end links 13 of the compensating cross-chain 12 will be tightly engaged in the bight portion 7 of the locking member 6, all as best seen in Figure 3.

It will be apparent that the free swinging or compensating chain 12 is always engaged in the lock member 6 and, therefore, will always close the "gap", so to speak, which otherwise would exist across the portion of the chain A at which the side-chain ends are locked to each other. Furthermore, since the compensating chain 12 is permanently fixed to those side-chain ends which are also equipped with the free swinging links 11', the slack or looseness of the chain may be readily taken up without interfering with the gap-closing or compensating function of the free swinging or compensating cross-chain 12.

It will also be readily understood by those familiar with the art that skid chains constructed in accordance with my present invention are exceptionally simple in construction and operation and may be very easily and conveniently manipulated when mounted on and demounted from the tire. Furthermore, since the compensating chain 12 is held at its free ends s' by the lock structure B, it therefore cannot become tighter than the lock structure B itself and may be unfastened or released just as readily. On the other hand, when in actual tractive operation, the compensating chain will be securely held in the lock structure B and cannot become accidentally unfastened.

It will be understood that changes and modifications in the form, construction, arrangement, and combination of the several parts of the chain may be made and substituted for those herein shown and described without departing from the nature and principle of my invention.

Having thus described our invention, what we claim and desire to secure by Letters Patent is:

1. An anti-skid chain comprising a pair of side-chains, a fastener on one end of each side-chain selectively engageable with any one of a plurality of links adjacent the other end of said side-chain, a plurality of cross-chains permanently connected at their ends to and extending transversely between said side-chains, and a cruciform cross-chain permanently connected to the side-chains at their second-named ends and being detachably connected to the fasteners.

2. A tire chain assembly comprising a pair of side-chains, each side-chain being formed with coupling means at one end thereof for detachably making fast to any of a series of links adjacent the other end of the chain whereby each side-chain may be adjustably connected to form a closed loop of desired size, cross-chain members connecting the side-chains together including a cross-chain adjacent said coupling means and another cross-chain adjacent said series of links, a compensating cross-chain permanently attached at one end to one of the side-chains adjacent the second-named cross-chain, said compensating cross-chain being of sufficient length to bridge the coupling points of the side-chains and extend to a point adjacent the first-named cross-chain when the tire chain assembly is mounted on a tire, and means adjacent said first-named cross-chain detachably engageable with said free end of the compensating cross-chain.

3. A tire chain assembly comprising a pair of side-chains, each side-chain being formed with coupling means at one end thereof for detachably making fast to any of a series of links adjacent the other end of the chain whereby each side-chain may be adjustably connected to form a closed loop of desired size, cross-chain members connecting the side-chains together including a cross-chain adjacent the coupling means and another cross-chain adjacent said series of links, a four legged compensating cross-chain set with two legs thereof permanently attached to the side-chains adjacent the second-named cross-chain, said compensating cross-chain being of sufficient length to bridge the coupling points of the side-chains and extend to a point adjacent the first-named cross-chain when the tire chain assembly is mounted on a tire, and a closed link at the free end of each of the other legs of the compensating cross-chain adapted to be detachably hooked fast in said coupling means.

4. A tire chain assembly comprising a pair of side-chains, each side-chain being formed with coupling means at one end thereof for detachably making fast to any of a series of links adjacent the other end of the chain whereby each side-chain may be adjustably connected to form a closed loop of desired size, cross-chain members connecting the side-chains together including a cross-chain adjacent said coupling-means and another cross-chain adjacent said series of links, a compensating cross-chain permanently attached at one end to one of the side-chains adjacent the second-named cross-chain, said compensating cross-chain being of sufficient length to bridge the coupling points of the side-chains and extend to a point adjacent the first-named cross-chain when the tire chain assembly is mounted on a tire, and means on the free end of the compensating cross-chain adapted to detachably engage the coupling means.

5. In an anti-skid chain, a lock structure comprising a first chain-like, a second chain-link interlinked with the first link, a third link interlinked with the second link, a locking lever having a hooked end and being swingably connected to said third link, in such a manner that the hooked end thereof is insertable through the second link and a fourth chain-link swingably mounted within the first link for retentive engagement around the hooked end of said bar.

6. In an anti-skid chain, a lock structure comprising a first chain-link, a second chain-link interlinked with the first link, a third link interlinked with the second link; said third link being twisted for the provision of two lobes lying in planes substantially at right angles to each other, a locking lever having a hooked end and being swingably connected to said third link, and a fourth chain-link swingably mounted through the first link for retentive engagement around the hooked end of said bar.

ROBERT C. RUEFF.
LEONARD HAMMOND.